(No Model.) 2 Sheets—Sheet 2.

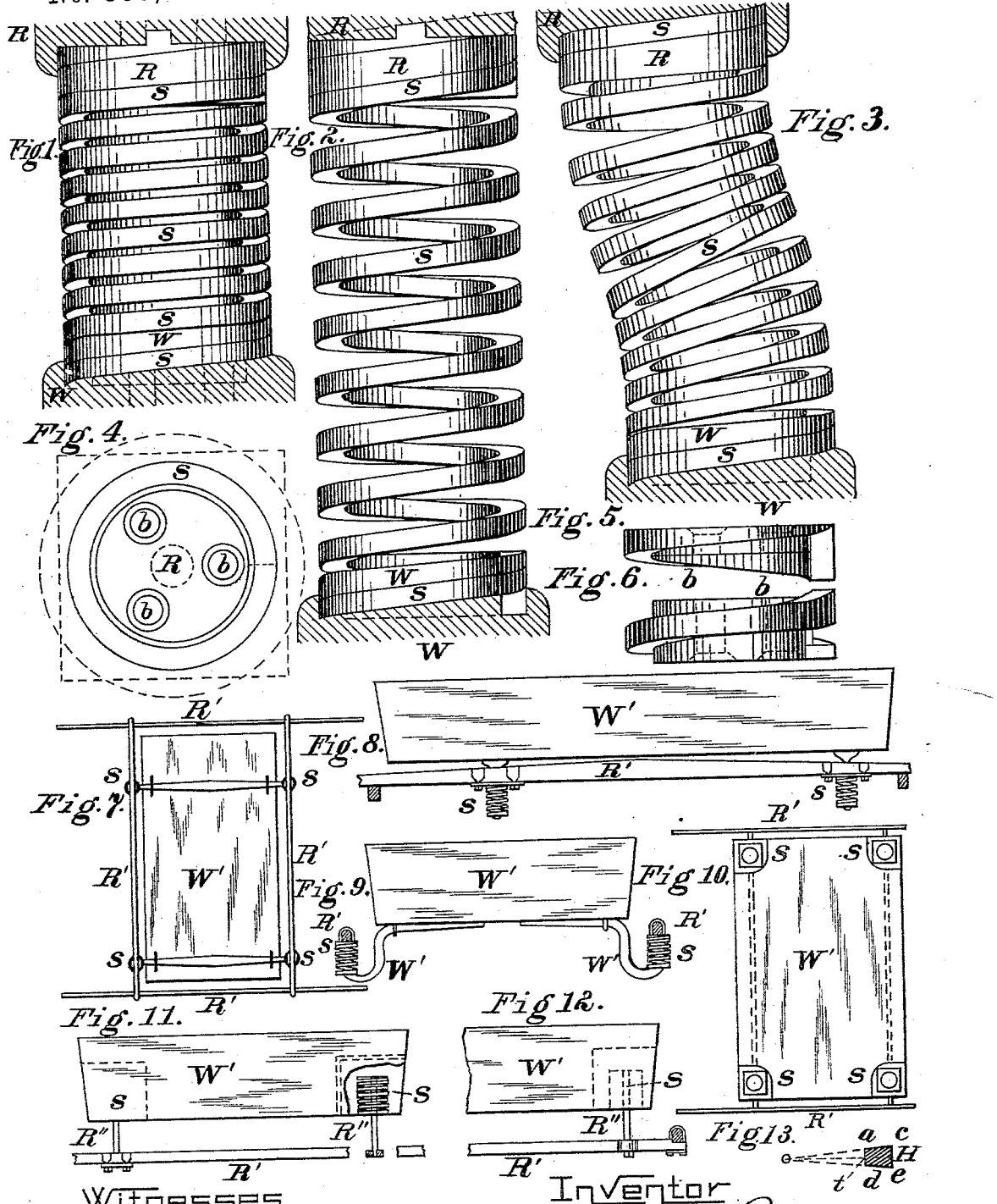

J. D. FURNAS.
VEHICLE SPRING.

No. 359,719. Patented Mar. 22, 1887.

WITNESSES
INVENTOR

UNITED STATES PATENT OFFICE.

JOHN D. FURNAS, OF WAYNESVILLE, OHIO.

VEHICLE-SPRING.

SPECIFICATION forming part of Letters Patent No. 359,719, dated March 22, 1887.

Application filed September 17, 1885. Serial No. 177,398. (No model.)

*To all whom it may concern:*

Be it known that I, JOHN D. FURNAS, of Waynesville, county of Warren, State of Ohio, have invented certain new and useful Improvements in Springs for Vehicles, &c., of which the following is a full and exact description, reference being had to the accompanying drawings, making part of this specification.

My invention relates to that class of springs for vehicles in which the same is spirally wound; and my invention consists in a novel construction of spring made in trapezoidal form in cross-section, having the two sides or angles formed on lines drawn or radiating from the axial center to the exterior circumference thereof.

It further consists in a novel construction of blocks by which the springs are connected to the vehicle-body and running-gear, having grooves or threads formed therein, one side of which is cut or formed on an incline, adapting it to the increased pitch of the spring caused by its insertion therein, and having the other side formed or inclined to the normal pitch of the spring, whereby the spring will hold itself connected to the block.

It further consists in the combination, with the vehicle-body and running-gear, of an extensible spirally-wound spring rigidly attached at its upper end to the running-gear and at its lower end to the body of the vehicle.

It further consists in the combination, with the spirally-wound spring, of divided spirally-grooved blocks and means for clamping said blocks together and to the spring, and to certain details in the construction and arrangement of parts, all as hereinafter described.

Figure 14:
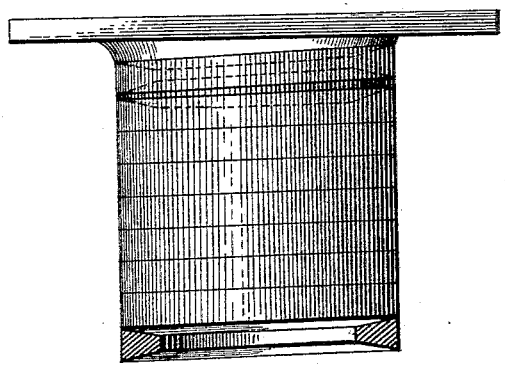
Figure 15:
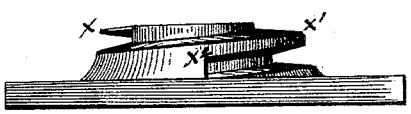

In the accompanying drawings, Figure 1 is a side view of an entire spring when not at tension, showing blocks connected thereto at each end, by which it may be attached to the vehicle and running-gear. Fig. 2 is a side view of the same, showing the spring as elongated by the application of a weight acted upon by the vertical force of gravity only. Fig. 3 is a side view of the same, showing the position of the spring at a tension which is caused by the application of a weight in a direction parallel with the resultant of vertical and lateral forces while both ends and their attachments, being rigidly connected, are held. Fig. 4 is a top view of the block and bolts by which the spring may be held and secured to the vehicle or running-gear. Figs. 5 and 6 are side views of the blocks having a portion of the screw-thread or groove formed in each, and in and between which the end of the spring is clamped. Figs. 7, 8, and 9 are, respectively, top, side, and end views showing the application of the device to a side-bar vehicle. Figs. 10, 11, and 12 are, respectively, top, end, and side views showing the application of the spring to a vehicle in which a vertical support passes up within the coil of the spring and attached rigidly to the upper end thereof, while the weight or load is connected to the lower end; and Fig. 13 shows a cross-section of the wire of the spring $o$, representing the axial center of the spring. Fig. 14 is a side view of a portion of a spring, showing the same connected with its holding-block; and Fig. 15 is a view of the holding-block, showing the form of the groove therein for receiving the end of the spring.

The springs S are made of wire, in trapezoidal form in cross-section, and may be of any size, width, or pitch, as may be desired.

In Fig. 13 a cross-section of the spring is shown, which I believe to be the most perfect form, and in which figure is also illustrated to some extent the method of determining the proper form of any wire, no matter what its size or what the diameter of the coil, and in which $o$ represents the axis of the coil, O H the radius of its outside, and $o\,t$ the radius of its inside, $a\,d$ the inner edge, and $c\,e$ the outer edge, the two sides or angles of which are formed on lines drawn or radiating from the axial center to the exterior circumference.

It may be shown experimentally that the strength of coils of spiral springs is inversely as their distances from their axes—that is, inversely as their radii. Any coil may be regarded as made up of a great number of very minute coils joined together as one. A cross-section of one of these minute imaginary coils may be regarded as a point; hence the strength of any point in a coil so made up is inversely as its distance from the axis. Then will the strength be equal at points equally distant from the axis. The width of a cross-section remaining the same, the strength of a wire is proportional to its thickness. Then, in order to maintain a uniform strength at every distance from the axis of coil to be constructed, the thickness must vary directly as the distance. Then the required thickness will be to the known thickness as the distance from the axis to the point at which it is desired to ascertain the thickness is to the distance from the axis to the point where the thickness is known. Then let $x$ equal the required thickness, $a$ the known thickness, $b$ the former distance, and $c$ the latter distance, then $x : a :: b : c$; hence $x = \frac{ab}{c}$. By constructing according to this formula a cross-section, each portion of the wire will be as able to withstand rupture as another, and no useless material is employed.

The spring thus formed is connected at each end to blocks W. These blocks may be made either in one or two parts, and where made in two parts a portion of the thread or groove is cut in each, and the two parts are held together by means of screws or bolts $b\ b$. The threads or grooves are formed in the blocks in such manner that a portion of the groove is formed to the normal pitch of the spring and inclines upward gradually on an incline corresponding to the increased pitch of the spring caused by its insertion in the groove, the normal pitch being from a point, $x$, to a point, $x'$, and the increased pitch from a point, $x'$, to a point, $x^2$, which construction of groove causes the spring to engage the inclined faces of the groove and hold the spring engaged with the block. One of these blocks is connected to the running-gear and the other to the body of the vehicle—or that is, the upper end of the spring is connected to the running-gear and the lower end to the body in a vertical position.

By connecting the spring rigidly and only at its ends to the body and running-gear great freedom of movement is obtained without undue strain upon the spring.

Having now described my invention, I claim—

1. A spring for vehicles made in trapezoidal form in cross-section, the two sides or angles of which are formed on lines drawn or radiating from the axial center to the exterior circumference thereof, as set forth.

2. A spirally-wound spring for vehicles made in substantially trapezoidal form in cross-section, the outer parallel side of which is to the inner parallel side as the radius or distance from the axis of the spring to the outer side is to the radius or distance from the same axis to the inner side, as set forth.

3. The blocks by which the springs are connected to the body and running-gear, having grooves or threads formed therein, substantially as described—that is, one portion of which is cut or formed on an incline corresponding to the normal pitch of the spring and the other portion on an increased incline or pitch corresponding to the increased pitch of the spring caused by its insertion therein—as and for the purpose set forth.

4. The combination, with the body and running-gear of a vehicle, of the spirally-wound vertically-arranged spring connected rigidly and only at its upper and lower ends to the body and running-gear, as set forth.

5. The combination of the spirally-wound spring, the blocks made in two parts, with a portion of the thread formed in each, and means, substantially as described, for holding the portions of the blocks together, as set forth.

JOHN D. FURNAS.

Witnesses:
PETER SELLERS,
HOWARD HOPKINS.